United States Patent [19]
Elliott et al.

[11] 3,914,241
[45] Oct. 21, 1975

[54] OIL SOLUBLE DERIVATIVES OF 2,5-DI-MERCAPTO-1,3,4-THIADIAZOLE AND PROCESS FOR PREPARATION THEREOF

[75] Inventors: John Scotchford Elliott; Gerald John Joseph Jayne; Rodney Ian Barber, all of Bracknell, England

[73] Assignee: Edwin Cooper & Company Limited, Bracknell, England

[22] Filed: Apr. 16, 1973

[21] Appl. No.: 351,459

[30] Foreign Application Priority Data
Apr. 25, 1972  United Kingdom............... 19048/72

[52] U.S. Cl. .... 260/302 E; 252/32.7 E; 260/302 SD
[51] Int. Cl.² ........................................ C07D 285/12
[58] Field of Search ................................ 260/302 E

[56] References Cited
UNITED STATES PATENTS
3,269,896   8/1966   Rufgnacht...................... 260/302 E

*Primary Examiner*—Richard J. Gallagher
*Attorney, Agent, or Firm*—Bacon & Thomas

[57] ABSTRACT

A compound, suitable for use as a lubricant additive, is an oil-soluble reaction product of a di-(organo) dithiophosphoric acid, wherein the organo groups are aliphatic moieties, and a 1,3,4-thiadiazole of the general formula:

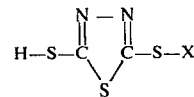

wherein X is a hydrogen atom or the residue of an ethylenically unsaturated alcohol, carboxylic acid, anhydride, amide, or imide, the reaction of the di-(organo) dithiophosphoric acid and the 1,3,4-thiadiazole being carried out in the presence of an oxidising agent. Also described are lubricating compositions containing the foregoing compounds as antioxidants and corrosion inhibitors.

11 Claims, No Drawings

OIL SOLUBLE DERIVATIVES OF 2,5-DI-MERCAPTO-1,3,4-THIADIAZOLE AND PROCESS FOR PREPARATION THEREOF

This invention relates to certain novel lubricant additives, more particularly to certain additives useful, inter alia, as corrosion inhibitors.

2,5-di-mercapto-1,3,4-thiadiazole and numerous derivatives thereof have been proposed, and in the case of certain derivatives, widely used, as corrosion inhibitors, particularly for inhibiting corrosion of copper, in lubricants. An improvement in the usefulness of this class of lubricant additive has now been made by preparing certain novel derivatives of 2,5-di-mercapto-1,3,4-thiadiazole which have corrosion inhibiting properties and in addition a degree of activity as antioxidant and load carrying additives.

Accordingly, the present invention provides a compound, suitable for use as a lubricant additive, which compound is an oil-soluble reaction product of a di-(organo) dithiophosphoric acid, wherein the organo groups are aliphatic moieties, and a 1,3,4-thiadiazole of the general formula:

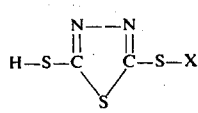

wherein X is a hydrogen atom or the residue of an ethylenically unsaturated alcohol, carboxylic acid, anhydride, amide or imide, the reaction of the di-(organo) dithiophosphoric acid and the 1,3,4-thiadiazole being carried out in the presence of an oxidising agent.

In the reaction of the di-(organo) dithiophosphoric acid with the 1,3,4-thiadiazole the principal reaction is believed to be as follows-

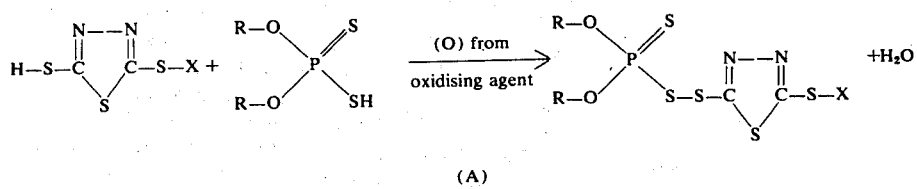

(A)

When X is a hydrogen atom further quantities of the di-(organo) dithiophosphoric acid may be reacted as follows:

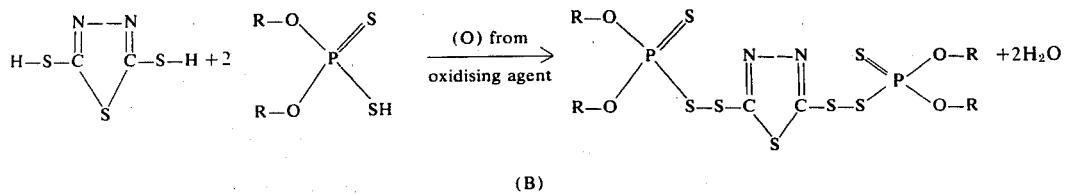

(B)

In the foregoing reaction equations (A) and (B), R represents the organo groups of the dithiophosphoric acid.

Accordingly, the present invention also provides an oil-soluble compound, suitable for use as a lubricant additive, which compound has the general formula:

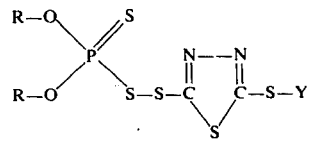

wherein Y is X as hereinbefore defined or a group of the formula:

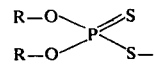

and each R is the same or different aliphatic organic group.

As is well known the di-(organo) dithiophosphoric acid may be prepared by reacting an appropriate aliphatic hydroxy compound, e.g. an alkanol, with phosphorous pentasulphide in approximately 4 to 1 molar ratio.

The organic moieties present in each molecule of the dithiophosphoric acid can be chosen in accordance with the criteria commonly adopted in additives containing dithiophosphate groups. That is to say, the organic moieties shold be of sufficient size, and sufficiently hydrocarbon in nature in the case of an additive to be used in mineral oil, to impart the desired oil-solubility. However, the organic moieties desirably should not be too large as this reduces the portion of the molecule constituting the active portion, i.e. which imparts the desired corrosion inhibiting and/or antioxidant properties, and leads to a need for large dosage weights to be used in order to impart the desired properties. Within the foregoing criteria, one may select the organic moieties from among the very wide variety of organic groups known in the art as suitable for inclusion in dithiophosphoric acids. The organic moieties may, but preferably do not, bear one or more inert substituents such as alkoxy groups. Preferred organic moieties are alkyl groups containingg from 3 to 18, more preferably 3 to 10, carbon atoms, and they are preferably primary or secondary alkyl groups, particularly the latter. The two organic moieties may be the same. Alternatively, a mixture of organic moieties can be employed by using a dithiophosphoric acid containing two different organic groups and/or by using a mixture of two or more different dithiophosphoric acids.

The 1,3,4-thiadiazole co-reactant may be readily prepared, when X is a hydrogen atom, by the reaction of hydrazine with carbon disulphide in the presence of potassium hydroxide followed by acidification of the reaction mixture, as is well known. The resulting 2,5-dimercapto-1,3,4-thiadiazole can be used as a co-reactant in the present invention or may be employed to form other coreactants, wherein X is other than a hydrogen atom, which can aslo be used in the present invention. Thus, the 2,5-di-mercapto-1,3,4-thiadiazole may be condensed with an ethylenically unsaturated alcohol or carboxylic acid, preferably containing from 4 to 18 carbon atoms, or an ethylenically unsaturated anhydride, imide or amide of a carboxylic acid. Likewise, the anhydrides, imides and amides so used are preferably derivatives of a carboxylic acid containing from 4 to 18 carbon atoms. The condensation may be readily carried out by heating the co-condensants together at a suitable temperature. At too low a temperature the rate of condensation is unacceptably low whereas at too high a temperature the condensation may be deleteriously affected by decomposition of the 1,3,4-thiadiazole and other undesirable side-reactions. Accordingly, we prefer to use a temperature of from 120° to 160°C., with about 140°C usually being the optimum temperature. The condensation may be, but preferably is not, carried out in the presence of an inert solvent such as xylene.

The present invention also includes, in a further aspect, the process which comprises reacting a di(organo) dithiophosphoric acid, wherein the organo groups are aliphatic moieties, and a 1,3,4-thiadiazole of the general formula:

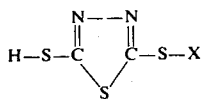

wherein X is as hereinbefore defined, in the presence of an oxidising agent to form an oil-soluble reaction product.

From the foregoing reaction equations (A) and (B) it will be seen that the dithiophosphoric acid can be reacted with the 1,3,4-thiadiazole in proportions such as to provide 1 or, in the case of 2,5-di-mercapto-1,3,4-thiadiazole, 2 dithiophosphate groups, substituted via a sulphur atom, on each 1,3,4-thiadiazole nucleus. It is possible for an excess of either reactant to be present during the reaction, except in the case where it is desired to react only one of the mercapto groups of 2,5-di-mercapto-1,3,4-thiadiazole. However, it is in general desirable not to use an excess of the 1,3,4-thiadiazole reactant in order to reduce any tendency to form oil-insoluble condensation products of two or more molecules of that reactant. It is preferred that the co-reactants are used in substantially stoichiometric proportions required to substitute the desired number of dithiophosphate groups (1 or 2) on the 1,3,4-thiadiazole nucleus.

The reaction temperature employed in the process of the present invention is preferably not more than 70°C more preferably not more than 50°C., and the oxidising agent employed may be a peroxide, hydrogen peroxide being particularly preferred. In using a peroxide oxidising agent it may be convenient to use a slight excess over the stoichiometric amount required. An extremely useful procedure is to add a slight, e.g. 10%, excess of aqueous hydrogen peroxide to a mixture of the 1,3,4-thiadiazole and the dithiophosphoric acid. The resulting exotherm raises the temperature of the reaction mixture and the temperature is preferably controlled, e.g. by cooling, so that it does not rise above 50°C. When the exotherm ceases, the reaction is substantially complete.

The preparation of additives of the present invention may conveniently be carried out in the presence of an inert solvent such as petroleum ether. After preparation of the additives they may be purified using conventional techniques, the preferred technique being to wash the additive with water, followed by separation and filtration of the additive and then distilling off any inert solvent used in the preparation of the additive.

In a further aspect the present invention also provides lubricating compositions comprising a major amount of a lubricating oil and a minor amount of one or more additives of the present invention. The amount of the additives of the present invention which is employed is preferably from 0.001 to 10% by weight based on the total weight of the composition. Within this range the most preferred amounts depend on the primary function of the additive. When used primarily as a corrosion inhibitor from 0.01 to 0.5% by weight, based on the total weight of the compositions, is especially suitable. However, when the primary function is as an antioxidant, larger amounts are preferably used, such as from 0.25 to 2.0% by weight, based on the total weight of the composition.

It will be understood that the lubricating compositions of the present invention may also contain, if desired, conventional lubricant additives such as ancillary antioxidants and corrosion inhibitors, antiwear additives, dispersants, particularly dispersants of the succinimide type, detergents, thickeners, pour-point depressants and viscosity index improvers. Numerous examples of such conventional additives are described in U.K. Pat. Specification No. 1,205,177 and the various documents referred to therein.

Also included within the scope of the present invention are additive concentrates comprising a minor amount of a lubricating oil and a major amount of one or more additives in accordance with the present invention, and additive packages comprising a minor amount of a lubricating oil and a major amount of a combination of one or more additives in accordance with the present invention and at least one other lubricant additive.

The lubricating oil used in the lubricating compositions of the present invention may be any of the well known synthetic ester oils, such as dioctyl sebacate. The preferred oils, however, are mineral oils of lubricating viscosity of well known type.

The present invention will now be illustrated with reference to the following examples.

EXAMPLE 1

0,0'-Dicapryl (1-methyl heptyl) dithiophosphoric acid (80.6g, 0.2m), 2,5-di-mercapto-1,3,4-thiadiazole (15g, 0.1m) and ethanol (500ml) were stirred together to give a clear solution and 15g (0.22m) of a 50% aqueous hydrogen peroxide solution was added thereto dropwise at a rate such that the resulting exotherm did not raise the temperature of the reaction mixture above 50°C.

A pale yellow solution was obtained to which was added a large quantity of water and the product was extracted with petroleum ether (B.Pt. 62 to 68°C.) to give a yellow solid and solution. The petroleum ether extract was washed with water, after filtering off the solid material, vacuum-stripped and filtered again.

During stripping the product darkened and the final product was a dark red liquid (73g) having a fruity smell and containing 3.02%N.

EXAMPLE 2

0,0'-Diisopropyl dithiophosphoric acid (49.6g, 0.2m), 2,5-di-mercapto-1,3,4-thiadiazole (15g, 0.1m) and ethanol (100 ml) were stirred together and 15g of 50% aqueous hydrogen peroxide solution added in the same manner as in Example 1.

When all the hydrogen peroxide solution had been added toluene and water were added to the product and the resulting mixture separated into two layers. The organic layer was washed with water, filtered and vacuum-stripped.

The final product was a yellow oily liquid (39.5g) containing 4.36%N.

EXAMPLE 3

50% hydrogen peroxide (13.6g, 0.2 mole) was added dropwise with cooling and stirring to 0,0'-diisobutyl dithiophosphoric acid (51.2g, 0.2 mole) 2,5-dimercapto-1,3,4-thiadiazole (15g, 0.1 mole) ethanol (25 ml) and water (34ml). During the addition the temperature was not allowed to rise above 50°C.

After completion of the addition the reaction mixture was refluxed for one hour whereafter 8g. of insoluble solid was filtered off. Toluene was added to the crude product which was then washed with water, dried and then stripped to yield 44.3g of a pale yellow liquid containing 3.01%N.

EXAMPLE 4

In a similar manner as in Example 3 a product was prepared from the following reactants:

| | | |
|---|---|---|
| 0,0'-di-2-ethylhexyl dithiophosphoric acid | 82g | 0.2m |
| 2,5-Dimercapto-1,3,4-thiadiazole | 15g | 0.1m |
| Ethanol | 500 ml | |
| 50% Hydrogen peroxide | 15g | 0.22m |

The product was obtained in a yield of 60g and contained 1.75%N.

EXAMPLE 5

0,0'-di-(isopropyl/capryl) dithiophosphoric acid was prepared by reacting phosphorus pentasulphide with a 1:1 mole ratio mixture of isopropanol and capryl alcohol.

50% hydrogen peroxide (15g, 0.22 mole) was added dropwise to a mixture of 2,5-dimercapto-1,3,4-thiadiazole (15g, 0.1 mole), 0,0'-di-(isopropyl/capryl) dithiophosphoric acid (61g, 0.2m), ethanol (50ml) and water (50ml). After completion of the addition the reaction mixture was refluxed for one hour. Petroleum ether (B.Pt. 62°-68°C.) was added, the mixture filtered, then washed with water and finally stripped to yield 64.3g of a product containing 4.22%N.

EXAMPLE 6

50% hydrogen peroxide (15.0g, 0.22mole) was added dropwise to 0,0'-di-2-ethylhexyl dithiophosphoric acid (45g, 0.11 mole), 2,5-dimercapto-1,3,4-thiadiazole (15g, 0.1m) and 0,0'-di-isobutyl dithiophosphoric acid (28.8g, 0.11mole) in 50% ethanol (100 ml). When the addition was complete the mixture was refluxed for 1 hour, 200 ml petroleum ether (B. Pt. 62°-68°C.) added, the mixture left overnight and then filtered, 8.2g of solid being removed. The organic layer was washed with water, then the petroleum ether distilled off to yield 74g of a liquid which contained 3.14%N and which went cloudy on standing.

EXAMPLE 7

A product was prepared as in Example 5, using the following reactants:

| | | |
|---|---|---|
| 50% Hydrogen peroxide | 7.5g. | 0.11m |
| 2,5-Dimercapto-1,3,4-thiadiazole | 7.5g | 0.05m |
| 0,0'-di-tridecyl dithiophosphoric acid | 54g | 0.1m |
| Water | 50ml | |
| Ethanol | 50ml | |
| Petroleum Ether (B.Pt. 62–68°C | 200ml | |

The product (51g) contained 1.80%N.

EXAMPLE 8

A product was prepared from a sample of 0,0'-di-allyl dithiophosphoric acid of equivalent weight 243 (theory 210). The product was prepared as in Example 2 using the following reactants:

| | | |
|---|---|---|
| 0,0'-di-allyl dithiophosphoric acid | 48.6g | 0.2m |
| 2,5-Dimercapto-1,3-4-thiadiazole | 15g | 0.1m |
| 50% Hydrogen peroxide | 15g | 0.22m |
| Industrial methylated spirits | 100 ml | |

The product (21.1g) contained 5.8%N.

EXAMPLES 9 to 12

Products were obtained by reacting 2,5-dimercapto-1,3,4-thiadiazole with an ethylenically unsaturated compound to form an intermediate. 50% Hydrogen peroxide (0.11m) was added dropwise to a mixture of the intermediate (0.1m) and 0,0'-di-capryl dithiophosphoric acid (0.1m) stirred in Industrial Methylated Spirits. When the addition of hydrogen peroxide was complete the resulting mixture was refluxed for one hour, 200 ml petroleum ether (B.Pt. 62°–68°C) added, the organic layer washed with water, dried over anhydrous magnesium sulphate and the petroleum ether distilled off. When the crude product was taken up in petroleum ether any insoluble material was discarded.

Details of Examples 9 to 12 are shown in the following Table 1.

EXAMPLE 13

Oleic acid (56.4g, 0.2 mole) and 2,5-dimercapto-1,3,4-thiadiazole (30g, 0.2 mole) were stirred at 140°C for 6 hours cooled, ethanol (200ml) and 0,0'-di-isopropyl/1,3-dimethyl butyl dithiophosphoric acid (59.4g, 0.2mole) added. 50% hydrogen peroxide (15g, 0.22mole) was added dropwise to this solution keeping the temperature below 50°C. The mixture was then stirred under reflux for one hour, petroleum ether (200ml) added, the mixture water washed, dried (MgSO$_4$) and the solvent distilled off to yield a red mobile liquid. The yield was 130g and the product contained 4.00%N.

EXAMPLE 14

Example 13 was repeated substituting 0,0'-di-isopropyl dithiophosphoric acid (52.8g, 0.2mole) for the 0,0'-di-isopropyl/1,3-dimethyl butyl dithiophosphoric acid. The yield was 95g of a red liquid which contained 3.96%N.

EXAMPLE 15

Primene JMT (62g, 0.2 mole), maleic anhydride (19.6g, 0.2 mole) and a little toluene were stirred at a base temperature of 220°C with a water separator, until water ceased to be evolved. The mixture containing Primene JMT maleimide was cooled to 140°C and 2,5-dimercapto-1,3,4-thiadiazole (30g, 0.2 mole) added to the amide. This mixture was stirred at 140°C for 2 hours, cooled, ethanol (200 ml) and diisopropyl dithiophosphoric acid (46.6g, 0.2mole) added and stirred until homogenous. 50% hydrogen peroxide (12.7ml, 0.2mole) was added dropwise with stirring, the mixture refluxed for one hour, petroleum ether (400ml) added, the solution washed with water, filtered, and the solvent distilled off. The yield was 88g of a dark brown viscous liquid which contained 4.9%N.

EXAMPLE 16

Primene JMT (62g, 0.2mole) and maleic anhydride (19.6g, 0.2mole) were warmed and stirred, causing an exothermic reaction to occur. No water was evolved, the product being an amic acid. 2,5-Dimercapto-1,3,4-thiadiazole (30g, 0.2 mole) was then added and the mixture stirred for one hour at 140°C. The product was reacted with 0,0'-di-isopropyl dithiophosphoric acid and hydrogen peroxide as in the preceding example. The yield was 127g of a dark brown liquid which contained 5.4%N.

Various additives in accordance with the present invention were tested to determine their corrosion inhibiting, antioxidant and antiwear properties. Corrosion inhibiting properties were determined by Copper Strip tests and Silver Corrosion tests. In the Copper Strip test strips of copper were immersed for 3 hours at 120°C in a test blend consisting of a base oil having dissolved therein 0.1% by weight of the inhibitor under test and 2% dibenzyl disulphide, the latter being a source of active sulphur acting as a corrosive agent. The base oil used was either a 150 Solvent Neutral mineral oil of viscosities about 33 and 5.3cSt at 100°F and 210°F respectively; a dibasic acid ester of viscosities about 12.5 and 3.3cSt at 100°F and 210°F respectively or a pentaerythritol tetraester of viscosities about 26 and 5cSt at 100°F and 210°F respectively. After immersion the strips were removed, examined visually and a demerit rating assigned according to the degree of staining of the strip (ASTM standards). The results of these tests are shown in the following Table 2.

Further Copper Strip corrosion were also carried out in the 150 Solvent Neutral mineral oil in an identical manner except in that 4.4% sulphurised isobutylene was used in place of the dibenzyl disulphide as corrosive agent and the results of these tests are shown in the following Table 3.

Silver Corrosion tests were also carried out, by a modification of the test described in U.S. Pat. No. 2,719,126. Square silver plates measuring approximately 1.5cm × 1.5cm having a hole in one corner, were polished with 600 mesh carborundum and suspended by wire for 24 hours at a temperature of 145°C in a 75g sample of the same mineral oil test blend as used in the Copper Strip tests reported in Table 2. After the 24 hour period the silver plates were visually examined, washed with petroleum ether (B.Pt. 62°–68°C.), immersed in 10% potassium cyanide until clean, washed with water, washed with acetone and the weight loss during the test determined. The results of these tests are shown in the following Table 4.

Antiwear properties of the additives of the present invention were determined by means of the Timken O.K. load test in accordance with the Institute of Petroleum's Test Method IP/240/69. The apparatus employed comprises a roller mounted on a spindle, the roller being rotated against a seated metal block lubricated with the test blend. Also mounted on the spindle is a lever system to one end of which is applied a weight, the weight being increased until the test blend fails as judged by scoring of the seated metal block. The blends consisted of the test additive dissolved in the same mineral base oil as used in the Copper Strip tests. The results of the Timken O.K. load tests are shown in the following Table 5.

Antioxidant properties of the additives of the present invention were measured by Rotary Bomb Tests carried out in the manner described in the left-hand column of page 220 of the article entitled, "Evaluation of Antioxidants for Automotive Lubricants Using the Rotary Bomb" in the Journal of the Institute of Petroleum, Vol 55, No. 544, July 1969, pages 219 to 226. The tests were carried out at 150°C, with water present as described in the aforementioned article. The blends tested consisted of 0.5% by weight of the additive under test dissolved in a 500 Solvent Neutral mineral oil and 210°F respectively, and the results obtained are shown in the following Table 6.

From the results shown in Tables 2 to 6 it can be seen that the tested additives were in general effective corrosion inhibitors for copper and silver and in addition had useful antioxidant and antiwear properties all combined in a single, ashless additive.

TABLE 1

Examples 9 to 12

| Example No. | 2,5-Dimercapto-1,3,4-thiadiazole | Unsaturated Compound | Intermediate Formation Reaction Conditions | Yield | %N in Product |
|---|---|---|---|---|---|
| 9 | 15g. 0.1m. | Oleic acid (28.3g, 0.1m) | 9 hrs. at 140°C | 72g | 3.95 |
| 10 | " " | Crotonic acid (7.0 g, 0.1m) at 135–140°C | 3 hrs. | 42.2g | 2.63 |
| 11 | " " | Oleyl alcohol (26.8g, 0.1m) at 140°C | 6 hrs. | 61g | 3.62 |
| 12 | " " | Dodecenyl succinic anhydride (26.6g, 0.1m) | 9 hrs. at 140°C | 67.5g | 2.39 |

TABLE 2

Copper Strip Tests Using 2% Dibenzyl Disulphide
Demerit rating (ASTM) in:-

| Test Additive | 150 Solvent Neutral mineral oil | Dibasic acid diester | Pentaerythritol tetraester |
|---|---|---|---|
| None | 3b | 2e | 4a |
| Product of Example 1 | 1b | — | — |
| Product of Example 2 | 1a | — | — |
| Product prepared as in Example 3 | 1b | — | — |
| Product prepared as in Example 5 | 1b | 1b | 1b |
| Product of Example 8 | 1b | — | — |
| Product of Example 9 | 1a | 1b | — |
| Product of Example 10 | 1b | — | — |
| Product of Example 11 | 1a | 1b | — |
| Product of Example 12 | 1a | — | — |
| Product of Example 13 | 1b | — | 1b |
| Product of Example 14 | 1b | — | 1b |
| Product of Example 15 | 1b | 1b | — |
| Product of Example 16 | 1b | — | — |
| *Additive X | 1a | — | — |

*Additive X was a commercially used inhibitor consisting essentially of the compound:-

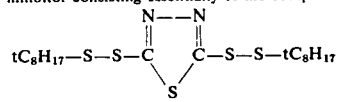

TABLE 3

Copper Strip Tests using 4.4% Sulphurised Isobutylene

| Test Additive | Amount (% by weight) | Demerit Rating |
|---|---|---|
| Product of Example 4 | 0.1 | 1b |
| Product prepared as in Example 3 | 0.1 | 1b |
| Product prepared as in Example 5 | 0.1 | 1b |
| Additive X | 0.2 | 1b/3b |
| Additive X + Additive Y · | 0.1 + 0.1 | 1b |
| None (base oil only) | — | 3a |

· Additive Y was a zinc dialkyl dithiophosphate derived from a mixture of isobutyl and n-pentyl primary alcohols and containing 8.1%P.

TABLE 4

Silver Corrosion Tests

| Test Additive | Weight Loss | Appearance |
|---|---|---|
| Product prepared as in Example 5 | 0.2 | Silvery/Pale Yellow |
| Product prepared as in Example 3 | 1.2 | Silver/Yellow/30% Grey |
| Product of Example 4 | 1.7 | Silver/Yellow/50% Grey |
| Additive X | 1.5 | Peacock |
| None (base oil only) | 10 | Dark Grey |

TABLE 5

Timken O.K. Load Tests

| Test Additive | Amount (% by weight) | Timken O.K. Load (lb) |
|---|---|---|
| Product prepared as in Example 3 | 0.2 | 30 |
| Product prepared as in Example 3 | 1.0 | 40 |
| Product of Example 4 | 1.0 | 45 |
| Product prepared as in Example 5 | 1.0 | 40 |
| None (base oil only) | — | 12 |

TABLE 6

Rotary Bomb Tests at 150°C.

| Test Additive | Time to 25lb Pressure (Drop (minutes) |
|---|---|
| Product prepared as in Example 3 | 122 |
| Product of Example 7 | 67* |
| Product prepared as in Example 5 | 174 |
| Product of Example 4 | 240 |
| None (base oil only) | 35* |

*Time to Induction Break

We claim:
1. A compound, suitable for use as a lubricant additive, which compound is an oil soluble reaction product of a di-(organo) dithiophosphoric acid, wherein the organo groups are alkyl or alkenyl of 3 to 18 C atoms, optionally containing an alkoxy substituent, and a 1,3,4- thiadiazole selected from the group consisting of 2,5-dimercapto-1,3,4-thiadiazole and a compound resulting from the condensation reaction of 2,5-dimercapto-1,3,4-thiadiazole at a temperature in the range of about 120°–160°C with a compound selected from the group consisting of alkenols and alkenoic acids of 4 to 18 carbon atoms and the anhydrides, amides and imides thereof, the reaction of the di-(organo) di-thiophosphoric acid and the 1,3,4-thiadiazole being carried out in the presence of a peroxide oxidizing agent.

2. A compound according to claim 1 wherein the organo groups are alkyl of 3 to 18 C atoms or alkyl and wherein the ethylenically unsaturated compound with which the 2,5-dimercapto-1,3,4-thiadiazole may be reacted is selected from the group consisting of alkenyl alcohols, alkenyl carboxylic acids and alkenyl carboxylic acid anhydrides.

3. A compound according to claim 1 wherein the organo groups are alkyl of 3 to 18 C atoms or allyl and wherein the di-(organo) dithiophosphoric acid is reacted with 2,5-di-mercapto-1,3,4-thiadiazole.

4. A compound according to claim 1 wherein the organo groups are alkyl of 3 to 18 C atoms or allyl and wherein the di-(organo) dithiophosphoric acid is reacted with a condensation reaction product of 2,5-dimercapto-1,3,4-thiadiazole with a compound selected from the group consisting of oleic acid, crotonic acid, oleyl alcohol and dodecenyl succinic anhydride.

5. A compound according to claim 1 wherein the organo groups of the di-(organo) dithiophosphoric acid are the same or different and at least one is an alkyl group containing from 3 to 10 carbon atoms.

6. A compound according to claim 1 wherein at least one of the organo groups bears an alkoxy substituent.

7. A compound according to claim 1 wherein the di-(organo)dithiophosphoric acid and the 1,3,4-thiadiazole are reacted in substantially the stoichiometric proportions required to substitute the desired number of dithiophosphate groups on the 1,3,4-thiadiazole nucleus.

8. A compound according to claim 1 wherein the reaction is carried out at a temperature of not more than 50°C.

9. A compound according to claim 1 wherein the oxidising agent is hydrogen peroxide.

10. A compound according to claim 1 wherein the reaction is carried out in an inert solvent such as petroleum ether.

11. A process for preparing a compound suitable for use as a lubricant additive which process comprises reacting at a temperature of not more than 70°C a di-(organo) dithiophosphoric acid, wherein the organo groups are alkyl or alkenyl of 3 to 18 C atoms, optionally containing an alkoxy substitutent, and a 1,3,4-thiadiazole selected from the group consisting of 2,5-dimercapto-1,3,4-thiadiazole and a compound resulting from the condensation reaction of 2,5-dimercapto1,3,4-thiadiazole at a temperature in the range of about 120°–160°C with a compound selected from the group consisting of alkenols and alkenoic acids of 4 to 18 carbon atoms and the anhydrides, amides and imides thereof; the reaction of the di-(organo) dithiophosphoric acid and the 1,3,4-thiadiazole being carried out in the presence of a peroxide oxidizing agent to form an oil-soluble reaction product.

* * * * *